Oct. 20, 1953    G. E. HENNING    2,655,691
METHOD OF AND APPARATUS FOR
FORMING VULCANIZED ARTICLES
Filed Sept. 28, 1950
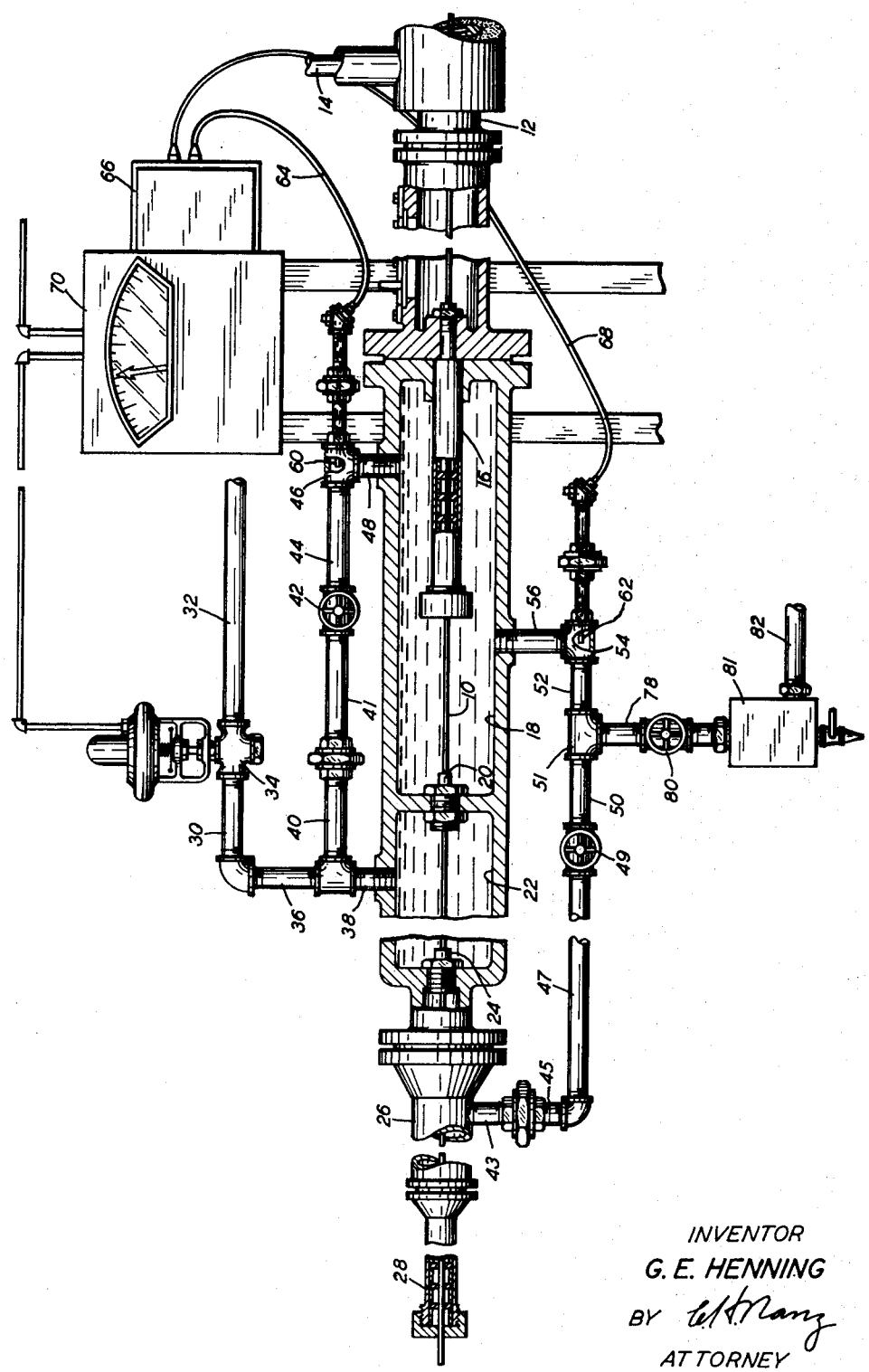
INVENTOR
G. E. HENNING
BY
ATTORNEY Patented Oct. 20, 1953

2,655,691

UNITED STATES PATENT OFFICE 2,655,691

METHOD OF AND APPARATUS FOR FORMING VULCANIZED ARTICLES

George E. Henning, Baltimore, Md., assignor to Western Electric Company, Incorporated, New York, N. Y., a corporation of New York Application September 28, 1950, Serial No. 187,265

6 Claims. (Cl. 18—6)

This invention relates to methods of and apparatus for forming vulcanized articles, and more particularly to methods of and apparatus for cooling vulcanized articles emerging from a vulcanizing chamber and for sealing steam in the vulcanizing chamber.

In the use of cooling and sealing tubes connected in tandem with vulcanizing tubes, it has been proposed to regulate the pressure of water introduced into such a cooling and sealing tube by means of differences in the temperatures at different points in the device. However, it has been difficult heretofore to obtain representative differences in temperatures in the water in the cooling and sealing devices.

An object of the invention is to provide new and improved apparatus for forming vulcanized articles.

A further object of the invention is to provide new and improved methods of and apparatus for cooling vulcanized articles and for sealing steam in the vulcanizing tubes from which the articles emerge.

A further object of the invention is to provide new and improved apparatus for controlling pressures of water introduced into cooling and sealing devices in accordance with differences in temperatures of the water at different points with respect to the cooling and sealing devices.

A method illustrating certain features of the invention may include advancing a filamentary article continuously through a vulcanizing zone, introducing a vulcanizing medium under a high pressure and at a high temperature into the vulcanizing zone, withdrawing the article from the vulcanizing zone through a cooling and sealing zone, introducing cold water under a high pressure into the cooling and sealing zone, withdrawing a portion of the water from the cooling and sealing zone at a point near the vulcanizing zone, and reintroducing the withdrawn water into the cooling and sealing zone at a point more remote from the vulcanizing zone than the point at which the water is withdrawn therefrom.

An apparatus illustrating certain features of the invention may include a vulcanizing tube, an elongated cooling and sealing tube connected in tandem with the vulcanizing tube, means for introducing cold water under a high pressure into the cooling and sealing tube, means for continuously withdrawing a portion of the water from the cooling and sealing tube at a point near the vulcanizing zone, and means for reintroducing the withdrawn water into the cooling and sealing tube at a point more remote from the vulcanizing tube than the point at which the water is withdrawn therefrom.

A complete understanding of the invention may be obtained from the following detailed description of a method and an apparatus forming specific embodiments thereof, when read in conjunction with the appended drawing, in which the single figure is a fragmentary, partially sectional view of an apparatus for practicing a method forming one embodiment of the invention.

Referring now in detail to the drawing, a composite vulcanizable article 10 is advanced through a vulcanizing tube 12 into which steam is introduced under a pressure of about 250 pounds per square inch by a steam supply pipe 14. The article 10 then is advanced directly through a baffled sealing unit 16 of the type disclosed and claimed in G. E. Berggren Patent 2,608,718, granted September 2, 1952, then into a cooling and sealing chamber 18, through a flow restricting gland 20 to an intermediate cooling chamber 22, through a flow restricting gland 24, through an elongated, unobstructed final cooling tube 26, which is substantially smaller in diameter than the chambers 18 and 22, and through a baffled exit sealing unit 28. Cold water under a pressure about that of the steam is supplied to a pipe 30 from a supply pipe 32 and a reducing valve 34. Water flows from the pipe 30 through pipes 36 and 38 into the intermediate cooling chamber 22, flows through pipes 40 and 41, a manually-operative valve 42, a pipe 44, a T-coupling 46, and a pipe 48 into the cooling and sealing chamber 18 at a point opposite the sealing unit 16 and between the entrance and exit ends thereof. The water introduced into the intermediate cooling chamber 22 fills that chamber and flows through the flow restricting gland 24 into the final cooling tube 26 and through the tube 26 and the exit sealing unit 28. The water flowing through the tube 26 has a substantially higher velocity than the water flowing through the chamber 22 and draws water from the cooling and sealing chamber 18 by a Venturi effect through pipes 43, 45 and 47, a manually-operative valve 49, a pipe 50, a T-coupling 51, a pipe 52, a T-coupling 54 and a pipe 56 communicating with the interior of the chamber 18 at a point therein slightly in advance of the exit end of the sealing unit 16.

A thermocouple 60 projects into the T-coupling 46, and a thermocouple 62 projects into the T-coupling 54 and is kept at the same temperature as the water bled from the cooling and sealing chamber 18. The thermocouple 60 is connected by a conductive cord 64 to a differential temperature responsive controller 66 of the type disclosed in G. E. Berggren Patents 2,581,230 and 2,581,231, granted January 1, 1952, and the thermocouple 62 is connected to the unit 66 by a conductive cord 68. The pressure of the water supplied to the pipe 30 is regulated by the reducing valve 34, which is controlled by the controller 66. The structure and general operation of the thermocouples 60 and 62, the controller 66 and the reducing valve 34 per se are disclosed and claimed in the above-mentioned Patents 2,251,230 and 2,251,231. A pipe 78 is connected to a manually-operable valve 80 and the T-coupling 51, and the valve 80 is connected through a steam trap 81 to a drain pipe 82. The controller per se is generally like the controller sold commerically under the trade name "Dynalog" by the Foxboro Company of Foxboro, Massachusetts, and shown in Book No. 644 published by that company.

Operation

Water flows continuously from the pipes 38 and 48 into the chambers 22 and 18, respectively, and escapes continuously through the exit sealing unit 28. The water entering the chambers 22 and 18 is cold relative to the temperature of the steam supplied to the vulcanizing tube 12, and is maintained at a pressure substantially equal to the pressure of the steam in the vulcanizing tube 12 to prevent the steam from flooding the chambers 18 and 22. The cold water flowing past the thermocouple 60 keeps this thermocouple at the temperature of the entering water. Steam bleeding into the cooling and sealing chamber 18 through the sealing unit 16 from any excess of the pressure of the steam over that of the water and by the pumping action of the article 10 warms the water that is drawn through the pipe 56 from the chamber 18 by the Venturi effect of the flow of water in final cooling tube 26, and the thermocouple 62 is maintained at the temperature of the water being bled from the chamber 18. Due to the position of the thermocouple 62 away from the vulcanized article 10, which agitates the water in the chamber 18, the thermocouple 62 is not affected by rapidly varying temperatures of the water created by such turbulent condition.

If the pressure of the steam in the vulcanizing tube 12 becomes greater than that of the water introduced into the cooling and sealing chamber 18 from the pipe 38, the steam bleeds through the seal 16 at a faster rate than that when the pressures of the water and steam are balanced. This steam heats the water flowing past the thermocouple 62 to a higher temperature than exists when the water pressure is as great as that of the steam. The thermocouple 60 meanwhile is kept at the inlet water temperature so that a greater than normal difference of temperature between the thermocouples 60 and 62 is created. This difference in temperature between the thermocouples 60 and 62 actuates the controller 66 to open the reducing valve 34 further to increase the pressure of the water supplied to the chambers 18 and 22. The pressure of the water is thus increased to a pressure at which the steam is prevented from flooding the cooling and sealing chamber 18 and permits only a small amount of steam to escape from the vulcanizing tube 12 into the chamber 18 with the vulcanized article 10.

The cold water introduced into the cooling and sealing chamber 18 condenses steam escaping into the chamber 18 and cools the hot vulcanized article 10, whereby the water is heated to a substantially higher temperature than that of the water introduced into the chamber 22. Most of the water flowing through the cooling and sealing chamber 18 is taken therefrom through the by-passing pipes 43, 46, 47, 50, 52 and 56, and only a small portion of this heated water enters the intermediate cooling chamber 22. Consequently, the substantially cooler water in the chamber 22 is not diluted by the warmer water from the chamber 18, and a high temperature differential is maintained between the portion of the vulcanized article 10 entering the intermediate cooling chamber 22 and that of the cooling water in the chamber 22. The water introduced into the intermediate cooling chamber 22 and that flowing from that chamber through the final cooling tube 26 is heated by the vulcanized article 10 and the article is cooled by the water to a point at which blistering of the article 10 does not occur under normal atmospheric pressures by the time the article reaches the exit seal 28. The water from the cooling and sealing chamber 18 is brought into the final cooling tube 26 at a point therein in which the water from the intermediate cooling chamber 22 flowing through the tube 26 is near the temperature of the water bled from the cooling and sealing chamber 18 into the tube 26 through the pipe 43. Hence, the maximum cooling effect of the water introduced into both the chambers 22 and 18 on the vulcanized article 10 is obtained.

The manually operated valve 40 and the manually operated valve 80 connecting the T-coupling 51 to the drain pipe 82 may be adjusted to permit all the water flowing through the pipe 56 to flow into the final cooling tube 26, or to permit all this water to flow into the drain pipe 82 and none of the water to flow to the tube 26. This might be desirable if very cold water were used in the cooling system so that it would be uneconomical to recool the water bled from the chamber 18 through the pipe 56, or else to permit part of the water to flow to the tube 26 and part of the water to flow to the drain pipe 82.

The flow of water into the cooling and sealing chamber 18 may be regulated by the valve 42, and normally is maintained relatively low so that the water in the chamber 18 is heated considerably by the vulcanized article 10 and the steam escaping therewith into the chamber 18. Hence, a high normal differential between the temperatures of the thermocouples 60 and 62 may be maintained. Thus, the portion of the vulcanized article entering the cooling and sealing chamber 18 at substantially the same temperature as that of the steam is cooled by considerably warmer water than that in the intermediate cooling chamber 22, which cools the portion of the article already partially cooled by the warmer water in the chamber 18. Since the water in the cooling and sealing chamber 18 is bled therefrom through the pipe 56, this warmer water does not materially raise the temperature of the water in the intermediate cooling chamber 22 so that a high differential in temperature is maintained between the water in the chamber 22 and portions of the article 10 passing therethrough even though the article has been cooled to a considerable extent in the chamber 18. Thus, the cooling effect on the article is maintained high.

The above-described method and apparatus serve to economically and effectively cool the vulcanized article 10 and to seal the steam in the vulcanizing chamber 12, and considerably reduce hunting of the controller 66 over that of previously known apparatus.

The front side walls of the chambers 18 and 22 are provided with suitable hand holes and pressure-tight covers of conventional design to permit the insertion of the various elements present in those chambers. These hand holes and covers are not seen in the drawing because the chambers 18 and 22 are shown in section therein and the front side walls of these chambers are not visible in the drawing.

What is claimed is:

1. The method of cooling a hot covered conductor being withdrawn continuously from a vulcanizing tube and sealing a vulcanizing fluid under a high pressure in the vulcanizing tube, which comprises advancing such a conductor from the tube seriatim through a cooling and sealing zone communicating with the vulcanizing tube, an intermediate cooling zone communicating with the cooling and sealing zone and a final cooling zone communicating with the intermediate cooling zone, introducing cold water under a pressure approaching that of the vulcanizing fluid separately into the cooling and sealing zone and the intermediate cooling zone, restricting the flow of water between the cooling and sealing zone and the intermediate cooling zone, and flowing water from the cooling and sealing zone around the intermediate cooling zone directly to the final cooling zone.

2. The method of cooling a hot vulcanized article being continuously withdrawn from a vulcanizing tube and sealing a vulcanizing fluid in the tube, which comprises withdrawing a hot, vulcanized filament from a vulcanizing tube successively through an entrance chamber, an intermediate chamber and a cooling chamber having restricted openings therebetween, introducing cold water under a high pressure individually into the entrance chamber and the intermediate chamber, continuously directing a portion of the water in the entrance chamber out of that chamber, around the intermediate chamber and into said cooling chamber, measuring the initial temperature of the water and the temperature of the portion being directed from the entrance chamber into the cooling chamber, and regulating the pressure of the water being introduced into the chambers in accordance with the differential between said temperatures to regulate the junction point of the vulcanizing fluid and the water.

3. The method of cooling a hot covered conductor being withdrawn continuously from a vulcanizing tube and sealing a vulcanizing fluid under a high pressure in the vulcanizing tube, which comprises advancing such a conductor from the tube seriatim through a cooling and sealing zone communicating with the vulcanizing tube, an intermediate cooling zone communicating with the cooling and sealing zone and a final cooling zone communicating with the intermediate cooling zone, introducing cold water under a pressure approaching that of the vulcanizing fluid separately into the cooling and sealing zone and the intermediate cooling zone, restricting flow of water between the cooling and sealing zone and the intermediate cooling zone, flowing water from the cooling and sealing zone around the intermediate cooling zone directly to the final cooling zone, measuring the respective temperatures of the water introduced into the first two zones and of the portion of the water flowing from the cooling and sealing zone directly to the final cooling zone, and regulating the pressure of the water introduced into the first two zones in accordance with the differences in said measured temperatures.

4. A vulcanizing apparatus, which comprises a vulcanizing tube having steam at a high pressure therein, a cooling and sealing chamber mounted at the exit end of the vulcanizing tube having restricted entrance and exit orifices, an intermediate elongated, unobstructed cooling chamber mounted at the exit end of the cooling and sealing chamber having a restricted exit orifice, a final elongated, unobstructed cooling chamber mounted at the exit end of the intermediate cooling chamber, a by-pass pipe connecting the cooling and sealing chamber to the final cooling chamber, means including a branched supply pipe for introducing cold water into the cooling and sealing chamber and the intermediate cooling chamber, pressure adjusting means for supplying water to the branched pipe at a high pressure, a thermocouple positioned in the branched pipe, a second thermocouple positioned in the by-pass pipe, and means responsive to differences of temperature of the thermocouples for regulating the pressure adjusting means.

5. A vulcanizing apparatus, which comprises a vulcanizing tube having steam at a high pressure therein, a cooling and sealing chamber mounted at the exit end of the vulcanizing tube having restricted entrance and exit orifices, an intermediate elongated, unobstructed cooling chamber mounted at the exit end of the cooling and sealing chamber having a restricted exit orifice, a final elongated, unobstructed cooling chamber mounted at the exit end of the intermediate cooling chamber, a bypass pipe line connecting the cooling and sealing chamber directly to the final cooling chamber, flow-regulating means mounted in the by-pass pipe line, a branched supply pipe for introducing cold water into the cooling and sealing chamber and the intermediate cooling chamber, and flow-regulating means for introducing water into the branched pipe at a high pressure.

6. A vulcanizing apparatus, which comprises a vulcanizing tube having steam at a high pressure therein, a cooling and sealing chamber mounted at the exit end of the vulcanizing tube having restricted entrance and exit orifices, an intermediate elongated, unobstructed cooling chamber mounted at the exit end of the cooling and sealing chamber having a restricted exit orifice, a final elongated, unobstructed cooling chamber mounted at the exit end of the intermediate cooling chamber, a by-pass pipe line connecting the cooling and sealing chamber to the final cooling chamber, a branch pipe connected to the by-pass pipe line for diverting water therefrom, and means for introducing cold water individually into the cooling and sealing chamber and the intermediate cooling chamber.

GEORGE E. HENNING.

References Cited in the file of this patent

UNITED STATES PATENTS

| Number | Name | Date |
|---|---|---|
| 2,581,255 | Henning | Jan. 1, 1952 |

FOREIGN PATENTS

| Number | Country | Date |
|---|---|---|
| 864,121 | France | Jan. 2, 1941 |